(12) United States Patent
Kwon et al.

(10) Patent No.: US 10,014,556 B2
(45) Date of Patent: Jul. 3, 2018

(54) BATTERY CELL INCLUDING STEPPED STRUCTURE

(71) Applicant: LG CHEM, LTD., Seoul (KR)

(72) Inventors: Sungjin Kwon, Daejeon (KR); Dong-Myung Kim, Daejeon (KR); Ki Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/437,254

(22) PCT Filed: Feb. 4, 2014

(86) PCT No.: PCT/KR2014/000927
§ 371 (c)(1),
(2) Date: Apr. 21, 2015

(87) PCT Pub. No.: WO2014/123329
PCT Pub. Date: Aug. 14, 2014

(65) Prior Publication Data
US 2015/0333375 A1    Nov. 19, 2015

(30) Foreign Application Priority Data
Feb. 5, 2013   (KR) ........................ 10-2013-0012725

(51) Int. Cl.
H01M 2/02     (2006.01)
H01M 10/0525  (2010.01)
H01M 10/0585  (2010.01)
H01M 10/04    (2006.01)

(52) U.S. Cl.
CPC ....... H01M 10/0585 (2013.01); H01M 2/021 (2013.01); H01M 2/0207 (2013.01); H01M 10/0413 (2013.01); H01M 10/0436 (2013.01); H01M 10/0525 (2013.01)

(58) Field of Classification Search
None
See application file for complete search history.

(56) References Cited

U.S. PATENT DOCUMENTS

| | | | |
|---|---|---|---|
| 6,524,741 B1 | 2/2003 | Bryan | |
| 7,410,724 B2 | 8/2008 | Yageta et al. | |
| 2001/0005561 A1 | 6/2001 | Yamada et al. | |
| 2003/0049527 A1* | 3/2003 | Yageta ................. | H01M 2/021 429/179 |
| 2003/0108787 A1 | 6/2003 | Endo et al. | |
| 2005/0191549 A1 | 9/2005 | Kang et al. | |
| 2011/0287308 A1 | 11/2011 | Kim et al. | |
| 2012/0058386 A1 | 3/2012 | Wyser et al. | |
| 2014/0304980 A1 | 10/2014 | Kim et al. | |

FOREIGN PATENT DOCUMENTS

| | | |
|---|---|---|
| CN | 102324557 A | 1/2012 |
| EP | 2058878 A1 | 5/2009 |
| JP | 2000-285881 A | 10/2000 |
| JP | 2001-68090 A | 3/2001 |
| JP | 2001-167743 A | 6/2001 |
| JP | 2001-256960 A | 9/2001 |
| JP | 2003-234094 A | 8/2003 |
| JP | 2003-288883 A | 10/2003 |
| JP | 2004-71301 A | 3/2004 |
| JP | 2004-185959 A | 7/2004 |
| JP | 2005-18990 A | 1/2005 |
| JP | 2005-38613 A | 2/2005 |
| JP | 2005-129267 A | 5/2005 |
| JP | 2007-520043 A | 7/2007 |
| JP | 2008-34556 A | 2/2008 |
| JP | 2008-243410 A | 10/2008 |
| JP | 2009-252731 A | 10/2009 |
| JP | 2012-79689 A | 4/2012 |
| KR | 2003-0066960 A | 8/2003 |
| KR | 10-2011-0128594 A | 11/2011 |
| KR | 10-1192619 B1 | 10/2012 |
| WO | WO 02/43178 A1 | 5/2002 |

OTHER PUBLICATIONS

JP 2009252731—Translation.*
International Search Report issued in PCT/KR2014/000927, dated May 16, 2014.

* cited by examiner

*Primary Examiner* — Ladan Mohaddes
(74) *Attorney, Agent, or Firm* — Birch, Stewart, Kolasch & Birch, LLP

(57) ABSTRACT

Disclosed herein is a battery cell configured to have a structure in which an electrode assembly, including positive electrodes, negative electrodes, and separators disposed respectively between the positive electrodes and the negative electrodes, is mounted in a battery case, wherein the battery case includes an upper case and a lower case, the upper case being provided with a first receiving part, in which the electrode assembly is received, the lower case being provided with a second receiving part, in which the electrode assembly is received, the first receiving part and the second receiving part being configured to have structures of different sizes, and the electrode assembly has an external shape corresponding to internal shapes of the first receiving part and the second receiving part.

22 Claims, 7 Drawing Sheets

[FIG. 1]
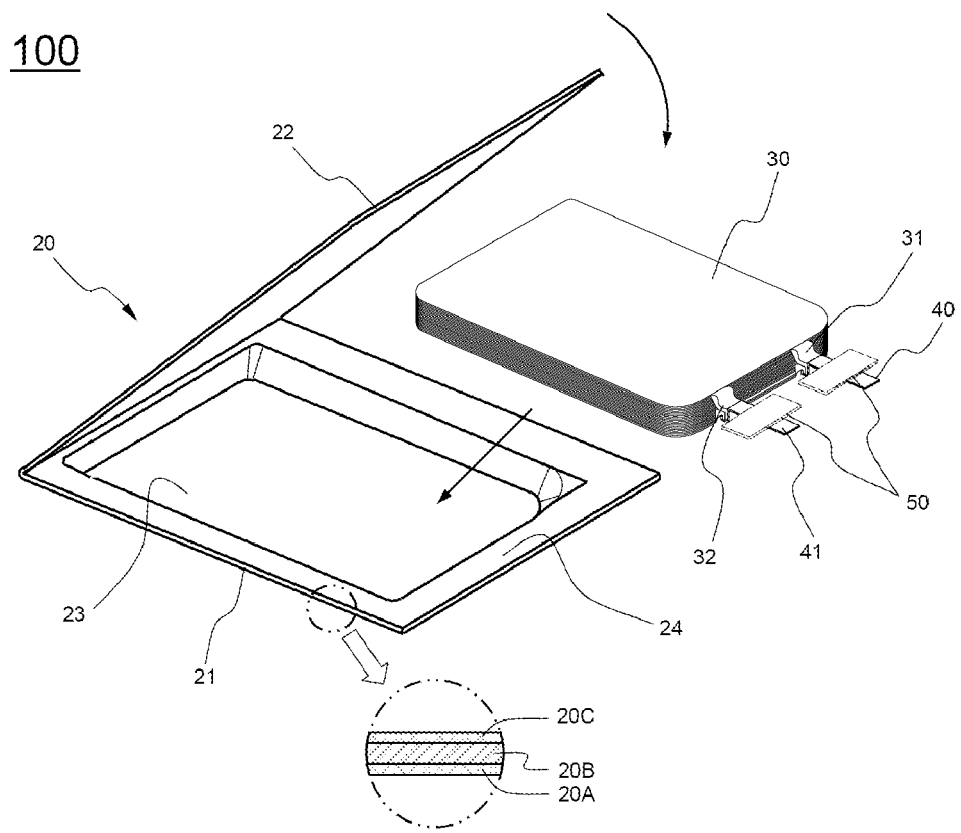

[FIG. 2]
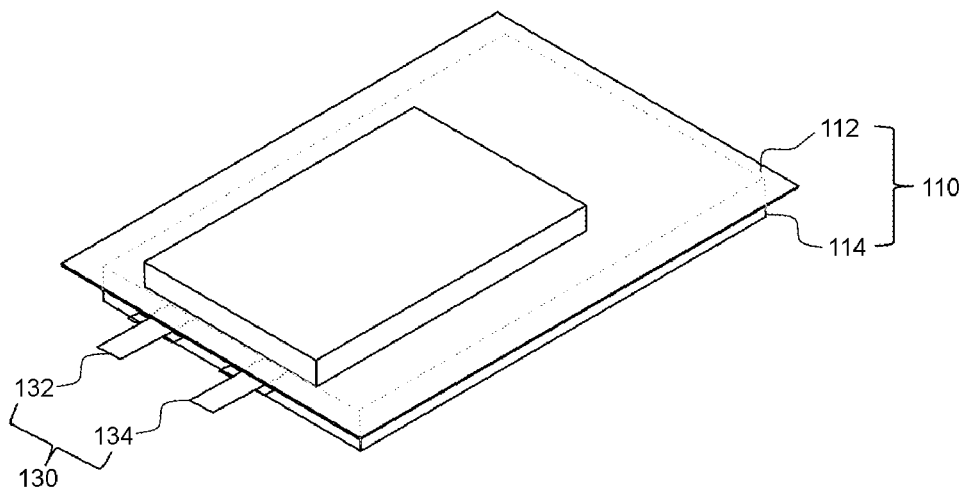

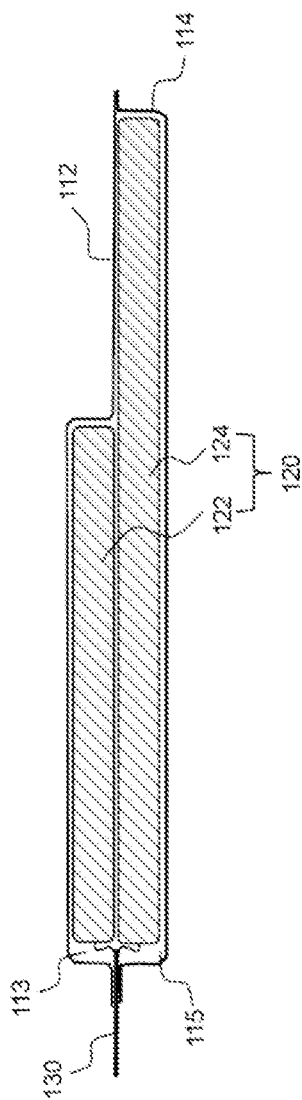
[FIG. 3]

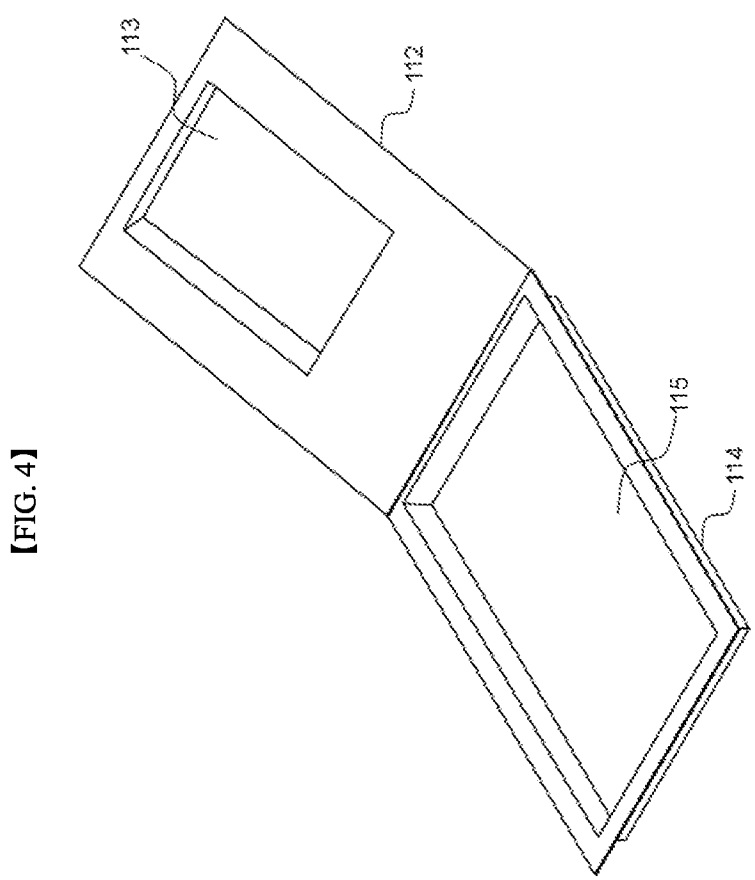

[FIG. 5]
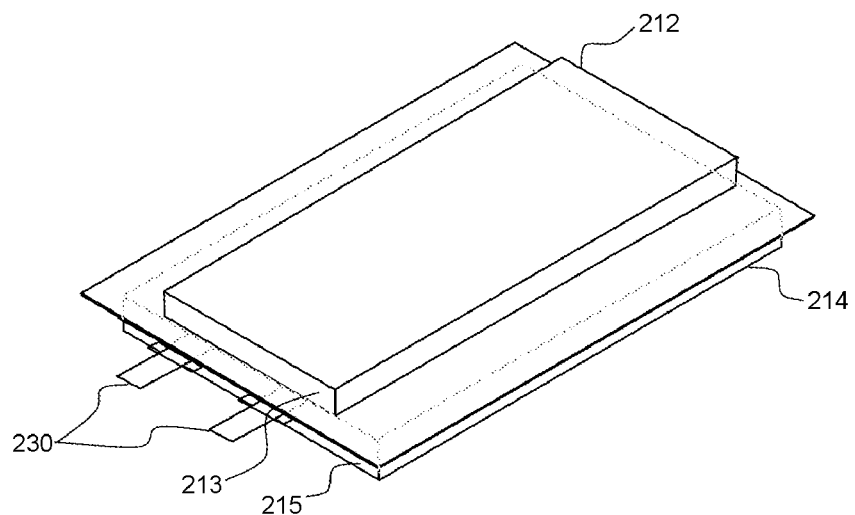
[FIG. 6]
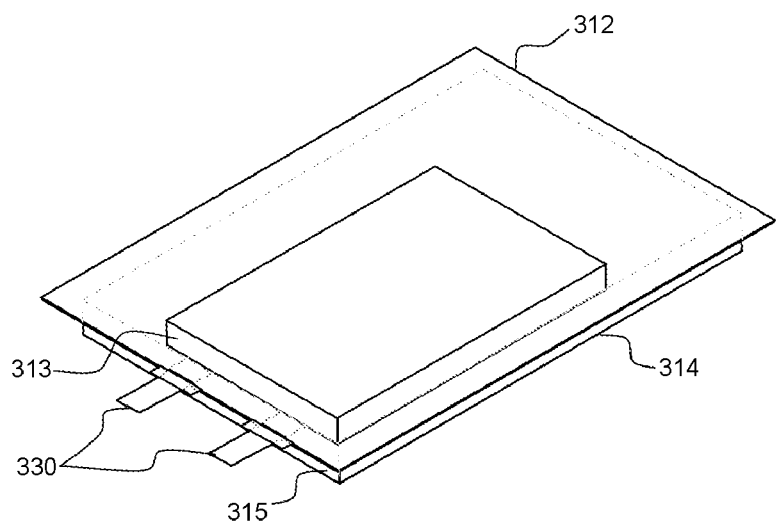

【FIG. 7】
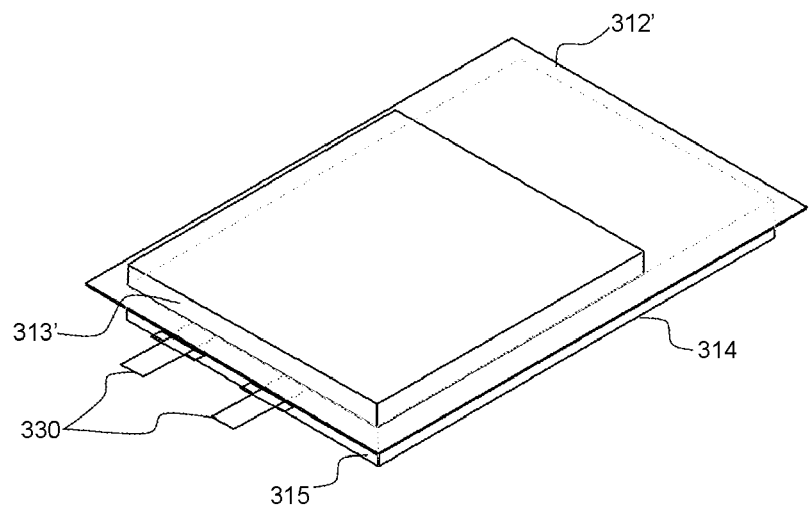
【FIG. 8】
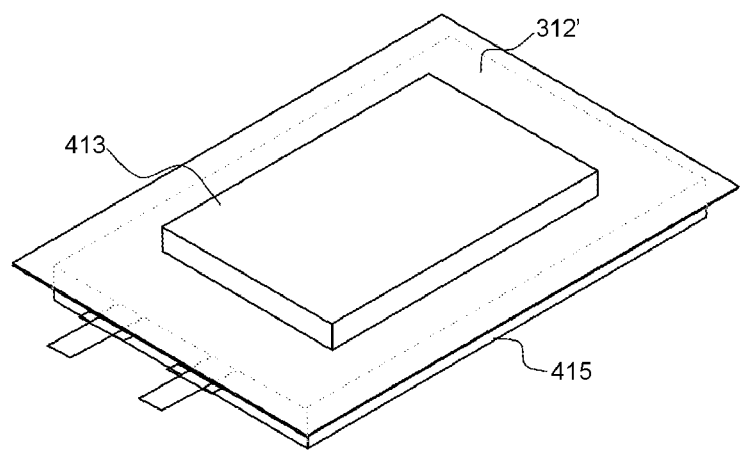

[FIG. 9]
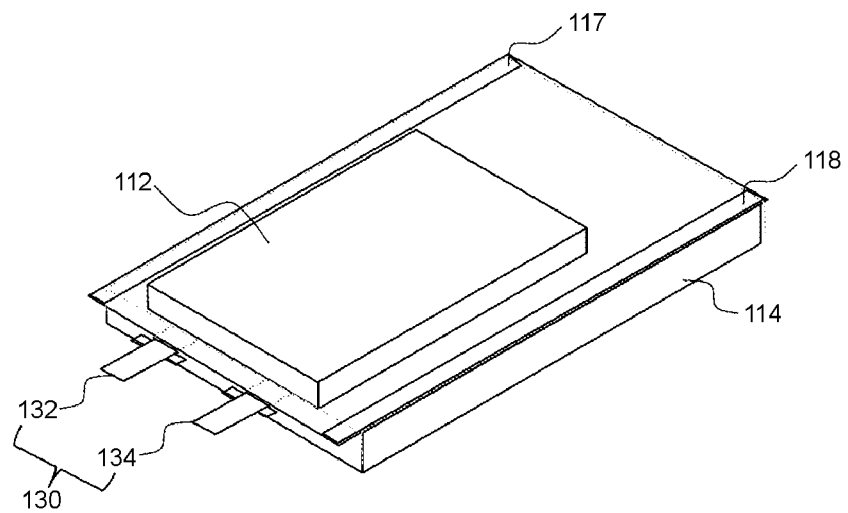

BATTERY CELL INCLUDING STEPPED STRUCTURE

TECHNICAL FIELD

The present invention relates to a battery cell including a stepped structure and, more particularly, to a battery cell configured to have a structure in which an electrode assembly, including positive electrodes, negative electrodes, and separators disposed respectively between the positive electrodes and the negative electrodes, is mounted in a battery case, wherein the battery case includes an upper case and a lower case, the upper case being provided with a first receiving part, in which the electrode assembly is received, the lower case being provided with a second receiving part, in which the electrode assembly is received, the first receiving part and the second receiving part being configured to have structures of different sizes, and the electrode assembly has an external shape corresponding to internal shapes of the first receiving part and the second receiving part.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be generally classified as a cylindrical battery, a prismatic battery, or a pouch-shaped battery. Based on the type of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

FIG. 1 is a view typically showing the structure of a pouch-shaped secondary battery including a stacked type electrode assembly.

Referring to FIG. 1, a pouch-shaped secondary battery 10 may be configured to have a structure in which an electrode assembly 30, including positive electrodes, negative electrodes, and separators disposed respectively between the positive electrodes and the negative electrodes, is mounted in a pouch-shaped battery case 20 in a sealed state such that two electrode leads 40 and 41 electrically connected to positive electrode and negative electrode tabs 31 and 32 of the electrode assembly 30 are exposed to the outside.

The battery case 20 may include a case body 21 having a depressed receiving part 23, in which the electrode assembly 30 is located, and a cover 22 integrally connected to the case body 21.

Although not shown, the battery case may include a lower case having a depressed receiving part, in which the electrode assembly is located, and an upper case for sealing the electrode assembly as a cover of the lower case.

The battery case 20 may be made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 may be respectively coupled to the electrode leads 40 and 41 by welding. In addition, insulative films 50 may be attached to the top and bottom of each of the electrode leads 40 and 41 to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, a new type of battery cell has been required in accordance with a trend change for a slim type design or various other designs.

In addition, the above-mentioned battery cells may be configured to include electrode assemblies having the same size or the same capacity. For this reason, in order to manufacture a battery cell having a new structure in consideration of the design of a device, to which the battery cell is applied, it may be necessary to reduce the capacity of the battery cell or modify the design of the device such that the size of the device is increased.

Furthermore, electrical connection may be complicated during modification of the design of the device with the result that it may be difficult to manufacture a battery cell satisfying desired conditions.

Therefore, there is a high necessity for an electrode assembly and a battery case applicable depending upon the shape of a device, to which a battery cell is applied, and a battery cell including the same.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces of a device, whereby it is possible to maximally utilize an internal space of the device, and the battery cell can be efficiently mounted in various external structures of the device in addition to a rectangular external structure of the device.

Technical Solution

In accordance with one aspect of the present invention, the above and other objects can be accomplished by the provision of a battery cell configured to have a structure in which an electrode assembly, including positive electrodes, negative electrodes, and separators disposed respectively between the positive electrodes and the negative electrodes, is mounted in a battery case, wherein the battery case includes an upper case and a lower case, the upper case being provided with a first receiving part, in which the electrode assembly is received, the lower case being provided with a second receiving part, in which the electrode assembly is received, the first receiving part and the second receiving part being configured to have structures of different sizes, and the electrode assembly has an external shape corresponding to internal shapes of the first receiving part and the second receiving part.

In the battery cell according to the present invention, the first receiving part and the second receiving part of the battery case have different sizes. When the upper case and the lower case are coupled to each other, therefore, a step may be formed at the battery case due to the difference in size between the receiving parts. The battery cell having the step may be more variously manufactured than a rectangular parallelepiped battery cell or a cylindrical battery cell.

The battery cell according to the present invention is based on the specific structure as described above. Consequently, it is possible to manufacture battery cells having various capacities and sizes based on the battery cell according to the present invention. Furthermore, the battery cell according to the present invention may be mounted in various spaces of a device in which the battery cell is mounted. Consequently, it is possible to maximally utilize an internal space of the device.

In addition, the electrode assembly has a shape corresponding to the shapes of the first receiving part and the second receiving part of the battery case. Consequently, it is possible to increase the capacity of the battery cell and, in addition, to improve utilization of a surplus space of the battery cell based on the compact structure of the battery cell.

The battery case may be a can-shaped battery case or a pouch-shaped battery case. The can-shaped battery case may be made of a metal material or a plastic material, and the pouch-shaped battery case may be made of a laminate sheet including a resin layer and a metal layer.

The laminate sheet may be configured to have a structure in which resin layers are applied to opposite major surfaces of a metal blocking layer. For example, the laminate sheet may be configured to have a structure in which an outer resin layer exhibiting high durability is attached to one major surface (outer surface) of the metal blocking layer and a resin sealant layer exhibiting a high thermal bonding property is attached to the other major surface (inner surface) of the metal blocking layer.

In a concrete example, the metal blocking layer may be made of aluminum exhibiting a gas intercepting property and ductility sufficient to configure in the form of a thin film.

It is required for the outer resin layer to exhibit high resistance against external environment. For this reason, the outer resin layer may be made of a polymer resin, such as polyethylene terephthalate (PET) or oriented nylon film, exhibiting more than predetermined tensile strength and weather resistance.

In addition, the resin sealant layer may be made of a cast polypropylene (CPP) resin which exhibits a high thermal welding property (thermal adhesive property) and a low hygroscopic property, which is necessary to restrain permeation of an electrolyte, and is not expanded nor corroded by the electrolyte.

In general, an open space of the can-shaped battery case may be sealed by welding in a state in which the open edge of the can-shaped battery case is covered by a cover. In the pouch-shaped battery case, on the other hand, the outer edge of the receiving unit may be sealed by thermal welding.

The battery case may have various shapes. For example, the upper case and the lower case of the battery case may be formed using a one-unit member, and outer edges of the upper case and the lower case may be thermally welded to each other for sealing in a state in which the battery case is folded. Specifically, the battery case may be folded such that the upper case covers the lower case. Sealed portions are formed at the other outer edge sides of the upper case and the lower case excluding outer edge sides of the upper case and the lower case at which the upper case and the lower case are connected to each other such that the upper case and the lower case are coupled to each other in a sealed state by thermal welding.

In another example, the upper case and the lower case of the battery case may be formed using separate members, and outer edges of the upper case and the lower case may be thermally welded to each other for sealing.

In a concrete example, the first receiving part and the second receiving part may have different planar sizes. When the upper case and the lower case are coupled to each other in a sealed state, therefore, a step may be formed at the battery case due to the difference in size between the receiving parts.

As mentioned above, the first receiving part and the second receiving part may be configured to have structures of different sizes. However, the structures of the first receiving part and the second receiving part are not particularly restricted. For example, the first receiving part and the second receiving part may be different from each other in terms of at least one selected from among a thickness, a breadth (horizontal length), and a width (vertical length).

For example, the first receiving part may have a smaller size than the second receiving part. In a concrete example, the first receiving part may have a smaller depth than the second receiving part. Alternatively, the first receiving part may have a smaller planar area than the second receiving part.

In a first example of the above structure, in comparison between the first receiving part and the second receiving part, the first receiving part may have a depth equivalent to 20% to 95%, preferably 30% to 90%, that of the second receiving part under a condition that the first receiving part and the second receiving part have the same planar area.

In a second example, in comparison between the first receiving part and the second receiving part, the first receiving part may have a planar area equivalent to 20% to 95%, preferably 30% to 90%, that of the second receiving part under a condition that the first receiving part and the second receiving part have the same depth.

In a third example, in comparison between the first receiving part and the second receiving part, the first receiving part may have a depth equivalent to 20% to 95%, preferably 30% to 90%, that of the second receiving part, and the first receiving part may have a planar area equivalent to 20% to 95%, preferably 30% to 90%, that of the second receiving part.

The first receiving part and the second receiving part may each be configured to have various planar structures, such as polygonal, circular, oval, and arc-shaped planar structures. In addition, the first receiving part and the second receiving part may have different planar shapes. For example, the first receiving part and the second receiving part may have rectangular planar shapes of different sizes.

At least one side of the first receiving part and at least one side of the second receiving part may be adjacent to each other in a vertical direction when the upper case and the lower case are coupled to each other in a sealed state.

In a first example of the above structure, one side of the first receiving part and one side of the second receiving part may be adjacent to each other in a vertical direction when the upper case and the lower case are coupled to each other in a sealed state.

In this case, electrode terminals may be located at one side of the first receiving part and one side of the second receiving part adjacent to each other.

In a second example, the first receiving part and the second receiving part may be formed such that one side of the first receiving part and one side of the second receiving part, at which the electrode terminals are located, are adjacent to each other in the vertical direction and such that the other side of the first receiving part and the other side of the second receiving part are adjacent to each other in the vertical direction.

In a third example, the first receiving part and the second receiving part may be formed such that one side of the first receiving part and one side of the second receiving part, at which electrode terminals are located, are adjacent to each other in the vertical direction and such that one side or opposite sides of the first receiving part and one side or opposite sides of the second receiving part perpendicular to one side of the first receiving part and one side of the second receiving part, at which the electrode terminals are located, when viewed from above are adjacent to each other in the vertical direction.

In a fourth example, the first receiving part and the second receiving part may be formed such that the other side of the first receiving part and the other side of the second receiving part, at which no electrode terminals are located, are adjacent to each other in the vertical direction and such that one side or opposite sides of the first receiving part and one side or opposite sides of the second receiving part perpendicular to the other side of the first receiving part and the other side of the second receiving part, at which no electrode terminals are located, when viewed from above are adjacent to each other in the vertical direction.

In addition, the first receiving part may be located inside the second receiving part when viewed from above in a state in which all sides of the first receiving part and all sides of the second receiving part are not adjacent to each other in the vertical direction unlike a structure in which at least one side of the first receiving part and at least one side of the second receiving part may be adjacent to each other in the vertical direction.

The shapes of the first receiving part and the second receiving part are not particularly restricted. That is, the first receiving part and the second receiving part may have various shapes. For example, at least one selected from between the first receiving part and the second receiving part may be configured to have a circular, oval, polygonal, or partially arc-shaped planar structure.

In a concrete example, the electrode assembly may include a first unit cell having an external shape corresponding to the internal shape of the first receiving part and a second unit cell having an external shape corresponding to the internal shape of the second receiving part.

That is, the electrode assembly may have a shape corresponding to those of the receiving parts of the battery case so as to increase a ratio of capacity to volume of the battery cell. Specifically, the first unit cell having the external shape corresponding to the internal shape of the first receiving part of the battery case may be located in the first receiving part, and the second unit cell having an external shape corresponding to the internal shape of the second receiving part of the battery case may be located in the second receiving part. Consequently, since the electrode assembly is constituted by the first unit cell and the second unit cell, and the shapes of the unit cells correspond to those of the unit cells, the unit cells may be stably located in the receiving parts, and the ratio of capacity to volume of the battery cell may be increased.

The shapes of the unit cells are not particularly restricted. That is, the unit cells may have various shapes. For example, the unit cells may each have a rectangular parallelepiped shape.

In this case, the unit cells may be stacked such that the electrode terminals of the battery cell, i.e. a positive electrode terminal and a negative electrode terminal of the battery cell, are arranged in the same direction. This structure is provided by configuring the unit cells such that positive electrode tabs and negative electrode tabs protrude from the unit cells in the same direction and stacking the unit cells such that the positive electrode tabs and the negative electrode tabs are located in the same direction.

In addition, the electrode tabs of the unit cells may be coupled to corresponding electrode leads to constitute battery cell electrode terminals. In a concrete example, the positive electrode tabs of the unit cells may be coupled to a positive electrode lead, and the negative electrode tabs of the unit cells may be coupled to a negative electrode lead. In this case, the unit cells are stacked such that the positive electrode tabs and the negative electrode tabs are located at the same positions, and thus the positive electrode tabs and the negative electrode tabs are coupled to the positive electrode lead and the negative electrode lead, respectively.

The battery cell may be a lithium ion battery cell or a lithium ion polymer battery cell. However, the present invention is not limited thereto.

In accordance with another aspect of the present invention, there is provided a device including the battery cell with the above-stated construction as a power source. The device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a conventional pouch-shaped secondary battery;

FIG. 2 is a perspective view showing a battery cell according to an embodiment of the present invention;

FIG. 3 is a vertical sectional view showing the battery cell of FIG. 2;

FIG. 4 is a perspective view of a battery case shown in FIG. 2;

FIGS. 5 to 8 are perspective views showing battery cells according to other embodiments of the present invention; and FIG. 9 is a perspective view showing a structure in which sealed portions of the battery case of FIG. 2 are bent.

BEST MODE

Now, exemplary embodiments of the present invention will be described in detail with reference to the accompanying drawings. It should be noted, however, that the scope of the present invention is not limited by the illustrated embodiments.

FIG. 2 is a perspective view showing a battery cell according to an embodiment of the present invention, and FIG. 3 is a vertical sectional view typically showing the battery cell of FIG. 2.

Referring to FIGS. 2 and 3, a battery cell 100 is configured to have a structure in which an electrode assembly 120 is mounted in a pouch-shaped battery case 110 made of a laminate sheet, and electrode leads 130, namely, electrode leads 132 and 134, electrically connected to the electrode assembly 120 extend outward from the battery case 110. The battery case 110 includes an upper case 112 and a lower case 114. The upper case 112 and the lower case 114 are respectively provided with a first receiving part 113 and a second receiving part 115, in which the electrode assembly 120 is received.

The first receiving part 113 and the second receiving part 115 of the battery case 110 are configured in the form of rectangles having different planar sizes. The electrode assembly 120 has an external shape corresponding to internal shapes of the first receiving part 113 and the second receiving part 115.

The electrode assembly 120 includes two unit cells 122 and 124 having different sizes. The unit cells 122 and 124 are stacked in a height direction in a state in which major surfaces of the unit cells 122 and 124 are opposite to each other. The unit cells 122 and 124 are respectively located in the first receiving part 113 and the second receiving part 115 of the battery case 110. In this structure, as shown in FIG. 3, therefore, the battery cell has a step in vertical section. Consequently, a margin space S1 is defined at the outside of the step. The margin space S1 is provided to cope with various conditions, such as irregular internal space of a device, to which the battery cell is applied, and interference with other parts. The receiving parts 113 and 115 and the unit cells 122 and 124 may be flexibly changed into various shapes based on conditions applied to the battery cell.

In a case in which the battery cell 100 has the above-described structure, it is possible to manufacture the battery cell such that the battery cell has various capacities and sizes, to easily mount the battery cell even in a space, in which a conventional battery cell is difficult to be mounted, and to mount the battery cell while having a larger capacity in a limited spaced according to the internal structure of a device, thereby maximizing utilization of the internal space of the device.

FIG. 4 is a perspective view typically showing the battery case of FIG. 2.

Referring to FIG. 4 together with FIG. 3, the battery case 110 includes the upper case 112 and the lower case 114, which are formed using a one-unit member. In a state in which the battery case 110 is folded, the outer edges of the receiving parts are thermally welded to each other for sealing. The first receiving part 113 and the second receiving part 115 are formed at the upper case 112 and the lower case 114, respectively. The first receiving part 113 and the second receiving part 115 are configured to have rectangular structures having different planar sizes. When the upper case 112 and the lower case 114 are coupled to each other in a sealed state, therefore, a step is formed at the battery case due to the difference in size between the receiving parts 113 and 115.

Meanwhile, although not shown, the upper case and the lower case, at which the first receiving part and the second receiving part are respectively formed, may be formed using two separate two-unit members, and the outer edges of the upper case and the lower case may be thermally welded to each other for sealing.

FIGS. 5 to 8 are perspective views showing battery cells according to other embodiments of the present invention.

FIG. 5 shows a structure in which a first receiving part 213 and a second receiving part 215 respectively formed at an upper case 212 and a lower case 214 are adjacent to each other in a vertical direction at one side of a battery cell at which electrode terminals 230 are located and the opposite side of the battery cell. FIGS. 6 and 7 show structures in which first receiving parts 313 and 313' and second receiving parts 315 respectively formed at upper cases 312 and 312' and lower cases 314 are adjacent to each other in a vertical direction at one side of each battery cell at which electrode terminals 330 are located and at one side or opposite sides of each battery cell perpendicular to one side of each battery cell at which the electrode terminals 330 are located when viewed from above.

In addition, FIG. 8 shows a structure in which a first receiving part 413 is located inside a second receiving part 415 when viewed from above in a state in which sides of the first receiving part 413 are not adjacent to corresponding sides of the second receiving part 415 in a vertical direction, which is different from the structures in which at least one side of the first receiving part is adjacent to a corresponding one side of the second receiving part in a vertical direction as shown in FIGS. 5 to 7.

That is, the positions of the first receiving part and the second receiving part are not particularly restricted. The first receiving part and the second receiving part may be formed at various positions. In addition, the first receiving part and the second receiving part may be configured to have a circular, oval, polygonal, or partially arc-shaped planar structure although the first receiving part and the second receiving part are shown as being configured to have a rectangular parallelepiped shape in the figures.

FIG. 9 is a perspective view showing a structure in which sealed portions of the battery case of FIG. 2 are bent. Referring to FIG. 9 together with FIG. 2, sealed portions 117 and 118 of the battery case formed by thermal welding of the outer edges of the upper case 112 and the lower case 114 are bent such that the sealed portions 117 and 118 are disposed in tight contact with the upper case 112 and the lower case 114. Consequently, the battery cell may be configured to have a more compact structure.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a stepped structure, whereby it is possible to easily secure a battery cell installation space, to maximally utilize an internal space of a device, to mount a battery cell having a high capacity in the device, and to more miniaturize the device.

In addition, it is possible to easily manufacture a desired battery cell due to structural characteristics of an electrode assembly and a battery case although the design of the battery cell is changed.

The invention claimed is:

1. A battery cell configured to have a structure in which an electrode assembly, comprising positive electrodes, negative electrodes, and separators disposed respectively between the positive electrodes and the negative electrodes, is mounted in a battery case, wherein
the battery case comprises an upper case and a lower case, the upper case being provided with a first receiving part, in which the electrode assembly is received, the lower case being provided with a second receiving part, in which the electrode assembly is received, the first receiving part and the second receiving part being configured to have structures of different sizes,
the electrode assembly has an external shape corresponding to internal shapes of the first receiving part and the second receiving part,
the electrode assembly comprises a first unit cell having an external shape corresponding to the internal shape of the first receiving part and a second unit cell having an external shape corresponding to the internal shape of the second receiving part,
the upper case and the lower case of the battery case are formed using a one-unit member, and
the first unit cell and the second unit cell having different sizes are stacked in a height direction in a state in which major surfaces of the first unit cell and the second unit cell are opposite to each other.

2. The battery cell according to claim 1, wherein the battery case is made of a laminate sheet comprising a metal layer and a resin layer.

3. The battery cell according to claim 1, wherein outer edges of the upper case and the lower case are thermally welded to each other for sealing in a state in which the battery case is folded such that the upper case covers the lower case.

4. The battery cell according to claim 1, wherein the first receiving part and the second receiving part have different planar sizes.

5. The battery cell according to claim 1, wherein the first receiving part and the second receiving part are different from each other in terms of at least one selected from among a thickness, a breadth (horizontal length), and a width (vertical length).

6. The battery cell according to claim 1, wherein the first receiving part has a smaller depth than the second receiving part.

7. The battery cell according to claim 1, wherein the first receiving part has a smaller planar area than the second receiving part.

8. The battery cell according to claim 1, wherein the first receiving part and the second receiving part each have a rectangular planar shape.

9. The battery cell according to claim 1, wherein one side of the first receiving part and one side of the second receiving part are adjacent to each other in a vertical direction.

10. The battery cell according to claim 9, wherein electrode terminals are located at one side of the first receiving part and one side of the second receiving part adjacent to each other.

11. The battery cell according to claim 9, wherein the first receiving part and the second receiving part are formed such that one side of the first receiving part and one side of the second receiving part, at which electrode terminals are located, are adjacent to each other in the vertical direction and such that the other side of the first receiving part and the other side of the second receiving part are adjacent to each other in the vertical direction.

12. The battery cell according to claim 9, wherein the first receiving part and the second receiving part are formed such that one side of the first receiving part and one side of the second receiving part, at which electrode terminals are located, are adjacent to each other in the vertical direction and such that one side or opposite sides of the first receiving part and one side or opposite sides of the second receiving part perpendicular to one side of the first receiving part and one side of the second receiving part, at which the electrode terminals are located, when viewed from above are adjacent to each other in the vertical direction.

13. The battery cell according to claim 9, wherein the first receiving part and the second receiving part are formed such that the other side of the first receiving part and the other side of the second receiving part, at which no electrode terminals are located, are adjacent to each other in the vertical direction and such that one side or opposite sides of the first receiving part and one side or opposite sides of the second receiving part perpendicular to the other side of the first receiving part and the other side of the second receiving part, at which no electrode terminals are located, when viewed from above are adjacent to each other in the vertical direction.

14. The battery cell according to claim 1, wherein the first receiving part is located inside the second receiving part when viewed from above.

15. The battery cell according to claim 1, wherein at least one selected from between the first receiving part and the second receiving part is configured to have a circular, oval, polygonal, or partially arc-shaped planar structure.

16. The battery cell according to claim 1, wherein the unit cells each have a rectangular parallelepiped shape.

17. The battery cell according to claim 1, wherein the unit cells are stacked such that electrode terminals are arranged in the same direction.

18. The battery cell according to claim 1, wherein each unit cell has electrode tabs coupled to corresponding electrode leads to constitute battery cell electrode terminals.

19. The battery cell according to claim 1, wherein the battery cell is a lithium ion battery cell or a lithium ion polymer battery cell.

20. A device comprising a battery cell according to claim 1 as a power source.

21. The device according to claim 20, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

22. A battery cell configured to have a structure in which an electrode assembly, comprising positive electrodes, negative electrodes, and separators disposed respectively between the positive electrodes and the negative electrodes, is mounted in a battery case, wherein
the battery case comprises an upper case and a lower case, the upper case being provided with a first receiving part, in which the electrode assembly is received, the lower case being provided with a second receiving part, in which the electrode assembly is received, the first receiving part and the second receiving part being configured to have structures of different sizes, the electrode assembly has an external shape corresponding to internal shapes of the first receiving part and the second receiving part, the first receiving part is recessed a first depth from a surface of the upper case, and the first receiving part has a first width and a first height measured parallel to the surface of the upper case at the surface of the upper case, the second receiving part is recessed a second depth from a surface of the lower case, and the second receiving part has a second width and a second height measured parallel to the surface of the lower case at the surface of the lower case, the first receiving part and the second receiving part are different from each other in terms of at least one selected from among the first and second widths or the first and second heights, the electrode assembly comprises a first unit cell having an external shape corresponding to the internal shape of the first receiving part and a second unit cell having an external shape corresponding to the internal shape of the second receiving part, the first unit cell and the second unit cell have different sizes, and each unit cell has electrode tabs coupled to corresponding electrode leads to constitute battery cell electrode terminals.

\* \* \* \* \*